United States Patent [19]

Gunning et al.

[11] 3,923,704

[45] Dec. 2, 1975

[54] PROCESS FOR MAKING POROUS POLYESTER GRANULES

[75] Inventors: Raymond Harry Gunning, Box Hill North; Frederick John Lubbock, Beaumaris, both of Australia

[73] Assignee: Dulux Australia Ltd., Melbourne, Australia

[22] Filed: Sept. 24, 1974

[21] Appl. No.: 508,993

[30] Foreign Application Priority Data

Oct. 4, 1973    Australia............................. 5101/73

[52] U.S. Cl....... 260/2.5 N; 204/159.15; 260/2.5 B; 260/29.6 NR; 260/29.6 RB; 260/40 R; 260/861; 260/862; 260/864; 260/870
[51] Int. Cl.$^2$...................... C08J 9/00; C08L 67/06
[58] Field of Search ....... 260/2.5 N, 29.6 NR, 2.5 B

[56] References Cited

UNITED STATES PATENTS

| | | | |
|---|---|---|---|
| 3,255,127 | 6/1966 | VonBonin et al................ | 260/2.5 N |
| 3,692,724 | 9/1972 | VanDyk...................... | 260/29.6 NR |
| R27,444 | 7/1972 | Will................... | 260/2.5 N |

*Primary Examiner*—Richard B. Turer
*Attorney, Agent, or Firm*—Cushman, Darby & Cushman

[57] ABSTRACT

A process in which vesiculated pigmented polyester resin granules are prepared as an aqueous slurry, by the curing of discrete globules of a solution of an unsaturated polyester resin in a polymerisable monomer in an aqueous phase, the polyester resin solution having pre-dispersed in it a dispersion of pigment in water. The critical factor is the degree of agitation permitted at each stage of the process.

2 Claims, No Drawings

PROCESS FOR MAKING POROUS POLYESTER GRANULES

This invention relates to a process of preparing pigmented vesiculated polyester resin granules and to granules so-prepared.

It has been proposed that granules of vesiculated polymer with diameters of the order of 0.5 to 500 microns be used in paints as matting or texturing agents. By "vesiculated" granules we mean granules of polymer which comprise a plurality of internal cells or vesicles. Ideally, each vesicle is formed as a discrete entity within a mass of non-porous polymer; that is, the polymer granule does not have a continuous porosity extended from one cell to another, but comprises a plurality of isolated vesicles surrounded by a continuous wall of polymer. There may be present a minor proportion of imperfect vesicles in which some of the polymer defining the wall of the vesicle has either not formed or has been broken away, allowing entry from one vesicle to its neighbour. Thus it is a characteristic feature of granules having a vesiculated structure that while they may well be vapour-permeable, they are not normally permeable to liquids.

It has further been proposed that if vesiculated polymer granules in which the vesicles are vapour-filled are incorporated in a paint composition, they can, unlike "extender" pigments used hitherto as flatting agents in paint, contribute opacity to a dry film of the paint by reason of their vesiculated structure. In order to do this effectively, the granule diameter should be at least five times the mean vesicle diameter. Further gains in opacity may be made by pigmenting the granules. By pigmented granules we mean polymer granules in which pigment has been dispersed throughout the polymer of which the granules are constituted. Alternatively, pigment particles may be incorporated within the vesicles of the granules and this use of pigment may be accompanied by some pigmenting of the polymer of the granules as well.

In describing the granules of this invention as "polyester resin" granules we use this term in the artrecognised sense of referring to the reaction products of unsaturated polyester resins which have been co-reacted with unsaturated monomer to form a cross-linked polymeric structure.

Unsaturated polyester resins which will co-react with a polymerisable unsaturated monomer to give a cross-linked resin are well known in the art, as are ways of initiating the polymerisation reaction. The unsaturated resin frequently contains unreacted carboxyl groups, the concentration of which is commonly expressed in the art as the acid value of the resin. We refer herein to such acidic resins as carboxylated unsaturated polyester resins. These cross-linkable resins are particularly suitable materials from which to prepare vesiculated polymer granules, because they can readily be polymerised directly to give a granular particle and when cross-linked they are insoluble in organic liquids, a characteristic of particular importance when they are to be used in paint compositions. Granules of this general type and a process of preparing them are described in, for example, Canadian Pat. No. 884,358.

One generally applicable method of preparing pigmented vesiculated polyester resin granules is to first emulsify a dispersion of pigment in water into a solution of an unsaturated polyester resin in a polymerisable monomer, to form a water-in-oil type emulsion. This emulsion is in turn dispersed in globular form in water to which a base and a colloid stabiliser has been added and polymerisation of the resin initiated by known means. The result is a slurry of pigmented vesiculated polyester resin granules in water. Dry granules may be derived from the slurry by conventional drying means.

Granules as prepared above are satisfactory and desirable materials for many purposes, but in some applications, for example where they are to be used as matting and opacifying agents in aqueous latex paints, and especially at high granule volume concentrations, it has been observed that the granules shrink appreciably as the paint dries. This shrinking in turn can lead to cracking of the dry paint film. We refer herein to such particles as "dimensionally unstable." However, if "dimensionally stable" granules are used, the cracking is eliminated or substantially overcome.

By "dimensionally stable" granules we mean granules which, when tested by the following method, have a shrinkage of less than 5%. A water-diluted drop of the slurry under test is spread on a microscope slide and as soon as movement of the granules has stopped, a field containing at least 10 granules is selected for measurement. The diameter of the chosen granules which should be roughly of the order of 10–20 micron, is measured while they are still wet using a microscope with a calibrated eyepiece and a magnification of about 400X. The field is kept under observation and the same granules re-measured 2–3 minutes after they are seen to have dried out. At least 10 granules should be measured and the shrinkage, calculated as percentage reduction in diameter on drying, averaged out.

Dimensional stability can be imparted to the granules by selection of a base for use in the manufacturing process which has a dissociation constant in water (pKa value) of 8.5–10.5 and which is a water-soluble polyamine containing at least three amine groups selected from primary, secondary and tertiary amine groups and at a sufficient concentration to provide 0.3 to 1.4 amine groups per carboxyl group of the resin.

Experience with the large-scale manufacture of granules of the above type has shown that undesirable fluctuations in quality can occur at times, as shown by the formation of agglomerates of two or more particles, which agglomerates must be separated from the mass of of granules if they are not to unfavourably influence products in which they are used. For example, agglomerates of granules in a paint film can produce defects known to the art as "bittiness" and "flip".

We have now found that the above defects can be avoided by modifying the process to one having the following characteristics.

Our improved process consists of the steps of:
1. forming a dispersion of pigment in water containing a non-flushing pigment dispersing agent,
2. emulsifying the pigment dispersion into a solution of a carboxylated unsaturated polyester resin in a polymerisable monomer in the presence of a water-soluble polyamine as hereinabove described at a concentration providing 0.3 to 1.4 amine groups per carboxyl group of the unsaturated polyester resin and with sufficient mechanical agitation to reduce the size of the disperse particles to below 1 micron,
3. dispersing the above emulsion in the form of discrete globules in an aqueous continuous phase comprising a solution in water of a colloidal stabiliser for the dispersion and a water-soluble thickening agent with continuous mechanical agitation, the intensity of which is limited to lie below the threshold at which growth by coalescence of the disperse globules soformed takes place.

4. initiating and activating co-reaction of the unsaturated polyester resin and polymerisable monomer with simultaneous control of mechanical agitation to a level below the critical shear rate as hereinunder defined at least until a sample of the curing granules is insoluble in methyl ethyl ketone, and 5. continuing agitation until curing of the granules is essentially completed as determined by a specified maximum free polymerisable monomer level.

Optionally, the aqueous slurry of granules so-formed may be concentrated, e.g. by filtration or by passage through a centrifuge and the granules dried by conventional means.

There are no restrictions on the choice of pigment which may be used in this process other than those which will be apparent to one skilled in the art. For example, the selected pigment must be insoluble in the materials with which it is to be blended and inert with respect to the chemical reaction by means of which the unsaturated polyester resin and polymerisable monomer are caused to co-react. Thus suitable pigments are, for example, prime white pigments, e.g. titanium dioxide and zinc sulphide. Extender pigments, e.g. barytes, china clay and silica are also useful for this purpose and may be used to impart opacity to the granules when they are incorporated into the vesicles thereof. Alternatively, a coloured pigment may be used, for example red iron oxides, black magnetic iron oxide, lead chromate and yellow ochre. Organic pigments, for example phthalocyanine blues and greens and quinacridone pigments may be incorporated in the same manner. When the polyester resin itself is to be pigmented, this is done in conventional manner, normally by milling pigment into a solution of the unsaturated polyester resin in polymerisable monomer.

Pigment is dispersed in water by, for example, high-speed mixing, in the presence of a pigment dispersing agent. The dispersing agent must be of the non-flushing type; that is it is selected from the well-known class of pigment dispersants which will not cause pigment to transfer from an aqueous phase to a non-aqueous phase insoluble therein when two such phases are brought into intimate contact with each other. A suitable pigment dispersant is, for example, sodium hexametaphosphate.

Carboxylated unsaturated polyester resins which will cross-link by reaction with polymerisable monomers are well-known. The degree of carboxylation, as measured by the acid value of the resin, is not particularly critical for the purpose of this invention. For example, although resins with acid values below 10 mgm KOH per gm or higher than 50 mgm KOH per gm may, under appropriate conditions, yield suitable vesiculated polyester granules, in general we have found it advisable to select unsaturated polyester resins which have acid values of from 10 to 45 mgm KOH per gm. Preferably the acid value should be within the range of 17–25 mgm KOH per gm.

The polyester resins from which a selection is made are condensation products of polybasic acids (or the corresponding anhydrides) and dihydric alcohols. Polymerisable unsaturation is introduced into the molecule by the selection of an $\alpha$-$\beta$-ethylenically unsaturated acid, optionally in combination with a saturated acid or anhydride.

Thus suitable acids are, for example:
unsaturated aliphatic acids, e.g. maleic, fumaric, itaconic, citraconic and mesaconic acids; saturated aliphatic acids, e.g. malonic, succinic, glutaric, adipic, pimelic, azelaic, tetrahydrophthalic, chlorendic and sebasic acids; and saturated aromatic acids, e.g. phthalic, isophthalic, terephthalic, tetrachlorophthalic, trimellitic and trimesic.

Suitable dihydric alcohols are chosen from, for example, ethylene glycol, poly(ethylene glycols) e.g. diethylene glycol, hexane-1, 6-diol, propylene glycol, dicyclohexanol and neopentyl glycol. Alternatively the alcohol may be one which initially contained three or more hydroxyl groups, the groups in excess of two optionally being at least in part etherified with, for example, a monohydric alcohol e.g. methanol, ethanol and n-butanol or esterified with a monobasic acid, e.g. benzoic acid, p tert.-butyl benzoic acid and chain-like aliphatic acids of up to 18 carbon atoms, chain length e.g. coconut oil monoglyceride.

The methods by which unsaturated polyesters of this type are formulated and made are well known in the art.

The unsaturated monomer in which the unsaturated polyester resin is dissolved and with which it is cross-linked during the preparation of the granules must be essentially water-insoluble. Monomers which have a solubility at 20°C of less than 5% (w/w) in water are considered to be suitably water-insoluble for our purpose. A single monomer or a mixture of monomers may be used and in general the monomer will contain only a single polymerisable double bond. However, it is known that poly-functional monomers, that is monomers containing more than one polymerisable double bond are also used to cross-link unsaturated polyester resins. Such polyfunctional monomers are, however, normally present only as a minor constituent of a mixture of monomers, the major proportion of which is monofunctional monomer. Hence mixtures comprising e.g. divinyl benzene may be used in the performance of our invention.

In general, we have found that the best results are given by the use of styrene, 'vinyl toluene' or methyl methacrylate as the polymerisable monomer. The monomers may be used singly or in combination and preferably, for the most tractable process, should contain at least 50% by weight.

The choice of monomer is not, however, restricted to the above monomers alone. Bearing in mind the requirements that the total monomer must be essentially insoluble in water and also be a solvent for the unsaturated polyester resin, there may be present in a minor proportion other polymerisable unsaturated monomers to, for example, modify the physical properties of the coreacted resins. Typical co-monomers are, for example, ethyl acrylate, n-butyl methacrylate, acrylonitrile, and triallyl cyanurate.

Optionally a few percent by weight of a non-polymerising organic liquid, e.g. n-butanol or toluene, may be mixed with the monomer to increase the solubility of the polyester resin therein or may be introduced as an incidental part of the process, e.g. in preparing the polyester.

As hereinabove described, the water-soluble polyamine must contain at least three groups selected from primary, secondary and tertiary amine groups and must have a dissociation constant in water (pKa value) within the range of 8.5–10.5. If more than one type of amine group is present in the molecule then the relevant pKa value is that of the most basic amine group.

Suitable polyamine compounds are, for example diethylene triamine, triethylene tetramine and oligomers of vinyl pyridine or dimethylaminoethylmethacrylate with polyethylene glycol methacrylate or mixtures thereof.

The pigment dispersion is added slowly to the carboxylated unsaturated polyester resin solution which is continuously stirred to produce an emulsion of the pigment dispersion in the resin solution. The degree of mechanical agitation used is regulated to reduce the size of the disperse particles to the required size. In general, we prefer to form disperse particles of below one micron diameter. Such dispersions have adequate stability in the curing stage of our process and provide vesicles of the desired size in the completed granules.

The aqueous continuous phase in which the emulsion of water in unsaturated polyester resin solution is subsequently dispersed must contain a stabiliser for that dispersion. The most satisfactory stabiliser we have found is a water-soluble partially hydrolysed poly(vinyl acetate) containing 10–20% of unhydrolysed acetate units with a molecular weight of about 100,000. This is used at a typical concentration of about 0.1–1.0% by weight of the aqueous continuous phase. If insufficient dispersion stabiliser is used the suspension formed may be unstable, while if an excess is used, complete emulsification of the components with loss of the discrete globules of polyester resin solution may take place.

We have found it a desirable practice to also include in the aqueous continuous phase a water-soluble polymeric thickener, which serves to facilitate the formation of discrete particles of disperse phase of the desired size during the preparation of the dispersion as distinct from stabilising the disperse particles so-formed. The more viscous the continuous phase, the more readily discrete disperse particles can be formed, but the more power required for size-reduction. Hence a balance must be struck between these requirements and we have found as a general guide that 0.25–1.00% by weight of a high molecular weight water-soluble polymeric thickener, for example hydroxy ethyl cellulose, is a satisfactory system. We prefer to use high molecular weight thickeners to cut down the weight of soluble polymer introduced into the system because for some purposes the presence of excessive quantities of materials of this type can be a disadvantage, for example when the granules are to be used in a latex paint.

The rate of agitation is important; the rate of production of disperse particles of the required dimension is inefficient at low agitation rates while we have observed that if the agitation is too violent, disperse particles will coalesce and grow to larger diameters. This appears to be a reversible process which reaches equilibrium at a given rate of agitation and consequently it may be necessary to decrease rather than increase the rate of agitation if under particular conditions coarse globules form. The required rate of agitation depends on the nature of the particular formulation and the type of agitation used, but as a general guide we find that for impeller-type agitators, acceptable impeller tip speeds are usually of the order of 15 metres per second.

Polymerisation within the globules is brought about by a free radical initiator, e.g. an organic peroxide or bis-azo nitrile or by exposure to a radiation source such as radioactive cobalt or ultraviolet radiation. When an organic source of free radicals is used this is conveniently introduced into the reactants by dissolving it in the monomer or polyester solution before the globules suspension is prepared. The initiator may be a solid peroxide, for example benzoyl peroxide, but we have found it more convenient to use a liquid initiator such as, for example, cumene hydroperoxide, since this avoids the need to dissolve solid crystals in the liquid to be initiated. The free radical source is then activated by, for example, heating to its decomposition temperature.

Alternatively, a redox process may be used and this can be carried out at ambient temperature. Suitable combinations of initiators and activators are, for example, benzoyl peroxide initiator activated by diethylaniline and cumene hydroperoxide initiator activated by diethylenetriamine and ferrous iron.

The rate of agitation is quite critical at this stage of the preparation and until cure of the granules has proceeded beyond the point where they are no longer soluble in methyl ethyl ketone, it must not exceed the critical shear rate. The solubility in methyl ethyl ketone is observed on a sample of the granules examined under a microscope at X100 magnifications. The critical shear rate is defined as the maximum shear rate which will not cause any significant irreversible formation of agglomerates of two or more particles in a dispersion of the above type in which polymerisation has been initiated.

The shear rate is again characteristic of the particular equipment in use and formulation being processed, but it is readily observed in practice and hence can be allowed for in processing. It is to be understood that occasional doublets or more complex agglomerates of globules will form in most batches during curing of the polyester resin but these are usually of no significance in the final product. However, at higher rates of shear than the critical shear rate, the incidence of distorted clusters of granules is entirely unacceptable in, for example, the manufacture of matt paints.

The critical shear rate is commonly much lower than the shear rate which can be used to prepare the uninitiated dispersion of globules and hence at initiation and activation it is usual to reduce the speed of agitation. Quite frequently we have found it possible and even desirable in the interests of forming a uniform product to stop all agitation at this stage until the batch meets the above-described insolubility test.

Once the insoluble point is reached, agitation is resumed until cure is completed, as shown by the attainment of a specified maximum level of free polymerisable monomer. We commonly work to a level of 0.5% by weight maximum of free monomer.

The vesiculated granules so-formed may subsequently be mechanically separated from the aqueous continuous phase and dried or they may be incorporated as an aqueous slurry directly into suitable aqueous compositions. In either case, loss of water from the granules ultimately provides air and pigment-filled vesicles; in which form they exert their maximum opacifying effect.

By the process of this invention vesiculated granules of from 0.1 to 500 micron diameter may be prepared and with vesicle diameters ranging from 0.01 to 5.0 micron. The maximum achievable diameter of granules is not limited to 500 micron, however, and for special purposes granules of up to 2–3 mm diameter can be prepared by control of the initial globule size. Each granule will, on average, contain more than one vesicle and when the granules are intended for use as opacifying agents the vesicles, which may occupy from 65 to 80% by volume of the granule, should have diameters within the range of 0.015 to 5.0 micron, preferably 0.03 to 1.0 micron. The ratio of particle diameter to mean vesicle diameter should be at least 5:1.

Although the granule slurries of this invention may be used for a variety of purposes, for example as low-density fillers and opacifiers in plastic mouldings, polymer films and paper, they are particularly useful as opacifiers and matting agents for aqueous latex paints. Thus a typical aqueous latex paint will consist of a latex vehicle, pigment and certain auxiliary materials such as fungicides and stabilisers. By a latex vehicle we mean a stable dispersion in an aqueous liquid of particles of film-forming polymer which, when the vehicle is allowed to dry in air as a thin film on a substrate, coalesces to form a polymeric paint film in which the other solid constituents of the paint are embedded. It is in a latex paint such as this that the aqueous slurry of granules of our invention are particularly useful. The aqueous slurry may be added directly to the remaining constituents of the paint. The vesiculated granules persist as discrete particles in a dried film prepared from the paint composition.

The invention is illustrated by the following examples, in which all parts are expressed by weight.

EXAMPLE 1

Preparation of pigmented vesiculated cross-linked polyester resin granules having a diameter of approximately 30 micron by the process of the invention.

A polyester resin made from phthalic anhydride, fumaric acid and propylene glycol (mole ratios 1 : 3 : 4.4) was dissolved in styrene to a concentration of 70% by weight. The solution had a Gardner - Holdt viscosity of $Z_3$. The acid value of the solid polyester resin was 22.0 mg KOH per gm.

A colloid solution A was prepared by dissolving 1.8 parts of a fast-dissolving grade of hydroxyethyl cellulose in 326.2 parts of water and a colloid solution B was prepared by dissolving 7.5 parts of a poly (vinyl alcohol/vinyl acetate) in 92.5 parts of water. The poly(vinyl alcohol/vinyl acetate) was a partially hydrolysed poly(vinyl acetate) of approx. wt. average molecular weight 125,000, 87–89% hydrolysed and with a viscosity (as a 4% wt. aqueous solution at 20°C) of 35–45 centipoise.

An aqueous mill-base was prepared by blending together the following ingredients with a mechanical stirrer.

| | | |
|---|---|---|
| Titanium dioxide pigment | 208.0 | parts |
| Sodium hexametaphosphate | 0.8 | " |
| Water | 104.0 | " |

The sodium hexametaphosphate was used as a non-flushing dispersing agent for the pigment.

A water-in-oil type emulsion was prepared by vigorously stirring a mixture of 230 parts of the above aqueous mill-base and 1.2 parts of diethylene triamine into a mixture of 123 parts of polyester resin solution as above and 54.5 parts of styrene.

This emulsion was then immediately poured into a mixture of

| | | |
|---|---|---|
| colloid solution A | 446.0 | parts |
| colloid solution B | 80.0 | " |
| 70% cumene hydroperoxide | 2.7 | " | and stirred until the particle size of the disperse globules was about 20 micron diameter maximum. The stirring in this step was controlled so that the peripheral speed of the blade did not exceed 15 m/sec.

The stirring rate was then reduced to 5 m/sec and a mixture of 60 parts of water 0.4 parts of diethylene triamine and 0.03 parts of ferrous sulphate heptahydrate was added.

Stirring was then stopped and the batch allowed to exotherm as the disperse resin solution polymerised. The resulting polyester resin granules had a vesicle content of approximately 70% by volume. Examination of fractured granules with a scanning electron microscope confirmed the presence of pigment particles within the vesicles. The granules had a shrinkage of 4% when tested as hereinabove described.

EXAMPLE II

The procedure in Example I was followed except that a peripheral speed considerably greater than 15 m/sec was used for reducing the globules to size. It was found that with time an increasing number of larger granules formed, and these could not be reduced to 20 micron except by reducing the rate of agitation.

EXAMPLE III

The procedure in Example 1 was followed except that after the 60 parts of water, 0.4 parts of diethylene triamine and 0.03 parts of ferrous sulphate heptahydrate had been added stirring was continued at a rate of 5 m/sec peripheral speed throughout the polymerisation of the granules.

This batch was found to contain a proportion of agglomerated granules and was considered unsatisfactory. That is the batch had been stirred during the curing stage at a rate exceeding the critical shear rate.

EXAMPLE IV

Preparation of pigmented, vesiculated, cross-linked polyester resin granules using a mixture of polymerisable monomers.

The methods, materials and quantities of this example were identical to those of Example I, except that, in this example, the polyester was prepared from phthalic anhydride, maleic anhydride and propylene glycol (mole ratio 1: 3 : 4.5) and had an acid value of 35 mgm KOH per gm, and it was dissolved in a monomer mixture of equal parts of styrene and methyl methacrylate to a concentration of 70% by weight. The polyester solution had a Gardner-Holdt viscosity of Z.

The resulting polyester resin granules had a maximum diameter of about 30 micron and a vesicle content of about 70% by volume of the volume of the granules. The granules had a shrinkage of 4% when tested as hereinabove described and examination confirmed the presence of pigment particles within the granules.

We claim:
1. A process of preparing pigmented vesiculated polyester resin granules by
   1. forming a dispersion of pigment in water containing a non-flushing pigment dispersing agent,

2. emulsifying the pigment dispersion so-prepared into a solution of a carboxylated unsaturated polyester resin in polymerisable monomer in the presence of a water-soluble polyamine which has a dissociation constant in water (pKa) value of 8.5 – 10.5 and which contains at least three amine groups selected from primary, secondary and tertiary amine groups at a concentration providing 0.3 to 1.4 amine groups per carboxyl group of the unsaturated polyester resin and with sufficient mechanical agitation to reduce the size of the disperse particles to below one micron,
3. dispersing the above emulsion in the form of discrete globules in an aqueous continuous phase comprising a solution in water of a colloidal stabiliser for the dispersion and a water-soluble thickening agent with continuous mechanical agitation, the intensity of which is limited to lie below the threshold at which growth by coalescence of the disperse globules so-formed takes place,
4. initiating and activating co-reaction of the unsaturated polyester resin and polymerisable monomer with simultaneous control of mechanical agitation to a level below the shear rate at which irreversible formation of agglomerates of two or more granules takes place, at least until a sample of the granules is cured sufficiently to be insoluble in methyl ethyl ketone, and
5. continuing agitation until curing of the granules is essentially completed as determined by a maximum free polymerisable monomer level of 0.5% by weight.

2. A process according to claim 1 in which the polymerisable monomer comprises at least 50% by weight of styrene.

* * * * *